(12) United States Patent
Panoushek

(10) Patent No.: US 6,871,483 B1
(45) Date of Patent: Mar. 29, 2005

(54) HEADER HEIGHT RESUME

(75) Inventor: Dale W. Panoushek, Orion, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/865,284

(22) Filed: Jun. 10, 2004

(51) Int. Cl.$^7$ .............................................. A01D 75/28
(52) U.S. Cl. ..................................... 56/10.2 E; 701/50
(58) Field of Search ........................ 56/10.2 E, 10.2 R, 56/10.2 A, 1; 701/50

(56) References Cited

U.S. PATENT DOCUMENTS

| | | | |
|---|---|---|---|
| 4,413,685 A | 11/1983 | Gremelspacher et al. ... | 172/316 |
| 5,155,984 A | 10/1992 | Sheehan ..................... | 56/10.2 |
| 5,469,694 A | 11/1995 | Panousheck et al. ..... | 56/10.2 E |
| 5,613,352 A * | 3/1997 | Panoushek et al. ...... | 56/10.2 E |
| 5,666,793 A | 9/1997 | Bottinger ................. | 56/10.2 R |
| 5,995,895 A * | 11/1999 | Watt et al. ................ | 701/50 |
| 6,039,141 A | 3/2000 | Denny ....................... | 180/329 |
| 6,061,617 A * | 5/2000 | Berger et al. ............. | 701/50 |
| 6,148,593 A | 11/2000 | Heinsey et al. .......... | 56/10.2 R |
| 6,292,729 B2 | 9/2001 | Falck et al. ................ | 701/50 |
| 6,509,839 B2 * | 1/2003 | Nagatuska ............... | 340/691.1 |
| 6,591,591 B2 | 7/2003 | Coers et al. .............. | 56/10.2 G |
| 6,681,551 B1 | 1/2004 | Sheidler et al. .......... | 56/10.2 G |

* cited by examiner

*Primary Examiner*—Arpad Fabian Kovacs
(74) *Attorney, Agent, or Firm*—Brant T. Maurer; Rebecca Henkel

(57) ABSTRACT

A control system for setting operation positions and operating modes for a combine header and automatically moving the header to those positions and modes. The system includes first and second operator inputs that can be located on a propulsion handle of the combine and can be actuated for inputting commands for causing manual and automatic movements, respectively. A third operator input is actuable for setting positions and modes to which the header is automatically movable and can be positioned at a different location. As a result, in operation, an operator can utilize the first input for manually controlling the header, and the second input for initiating automatic movements to at least two predetermined positions and modes, without removal or repositioning of his or her hand on the propulsion handle.

31 Claims, 4 Drawing Sheets

HEADER HEIGHT RESUME

TECHNICAL FIELD

The present invention relates generally to a control system for moving a header of an agricultural combine, and more particularly, to a system operable for setting one or more positions and operating modes for the header, and in an automatic or resume mode for automatically moving the header to the one or more set positions and/or initiating operation in the set operating mode.

BACKGROUND ART

Commonly, vehicles, such as work machines, agricultural tractors and combines, and the like, require substantial operational involvement and control by the operator. For example, in a combine, the operator is required to control the direction and speed of the combine while also controlling the height and other operating parameters of the header for harvesting the crops. Accordingly, to reduce the effort required by the operator, it is useful to automate as many tasks performed by the operator as possible.

One task which has been automated is the raising and lowering of the harvesting head or header of a combine. Typically, the header is raised when the combine approaches an already harvested headland of a field, and is lowered to an operating position when the combine has been turned or otherwise positioned for entering an unharvested region of the field. More specifically, some combines permit an operator to activate a switch momentarily for the purpose of causing the header to raise to a predetermined elevation without further interaction by the operator. Upon completion of a turn at the headlands and re-entry into the crop, the operator can activate another switch, typically referred to as a resume switch or button, which causes the header to return to its previous position for harvesting. Reference in this regard, Panoushek et al. U.S. Pat. No. 5,469,694, issued Nov. 28, 1995 to Case Corporation. In the invention of that patent, movement of the header is controlled by a controller which permits the operator to momentarily toggle a resume switch to automatically raise the head, and momentarily toggle the switch to automatically lower the head, each at speeds proportional to the distance between the actual position of the head and the desired position. The resume switch is located on a propulsion handle movable for controlling movements of the combine. A multi-position switch movable for selecting from multiple header height settings, is located in a console adjacent to the propulsion handle. Other known systems provide multiple switches for selecting header height on top of the propulsion handle.

A problem found with locating the resume switch on the propulsion handle and the multi-position switch on the console is that the resume switch only returns the header to the position that the multi-position switch is currently set at. If a different position is desired, the operator must remove his or her hand from the propulsion handle to change the position of the console switch. A problem found with using multiple switches on the top of the propulsion handle is that it requires the operator to reposition his or her hand on the handle or remove the hand from the handle to actuate the switches.

Thus, what is sought is a control system for automatically moving a combine header, which provides improved operability and overcomes one or more problems set forth above.

SUMMARY OF THE INVENTION

What is disclosed is a control system for an actuator or a positioner assembly for moving a header of an agricultural combine, which provides improved operability and overcomes one or more of the problems set forth above. The combine preferably includes a propulsion handle movable by an operator for controlling movements thereof, and according to a preferred aspect of the invention, the control system includes a first operator input on the propulsion handle which can be a switch such as a conventional toggle switch or touch pad for manually controlling header movements, a second operator input on the propulsion handle which serves as a resume switch for initiating automatic movements of the header, and a third operator input which can be used for selecting or setting positions and operating modes to which the header is to be automatically moved. The control system further includes a processor and a memory, operable for storing information representative of positions and operating modes of the header, the controller being connected to the first input, the second input and the third input for receiving input commands or signals therefrom, and the controller being connected to the actuator or positioner assembly for controlling it for moving the header responsive to the input signals from the inputs.

The controller is preferably programmed to operate in a manual state which allows input commands or signals from the first operator input to control the actuator to move the header in at least a first direction and an opposite second direction. The controller is also programmed to operate in an automatic state, including in a "return to cut" operating mode, to automatically control the actuator to move the header successively to first and second predetermined positions and modes represented by information stored in the memory, responsive to successive input commands or signals from the second operator input or resume switch. Additionally, the controller is operable in a set state responsive to a first or "set 1" input command signal from the third operator input to automatically store information representative of a current position and operating mode of the header in the memory as the first predetermined position and mode, and responsive to a second input or "set 2" signal, to automatically store information representative of a current position and mode of the header as the second predetermined position and mode. The set state is preferably operable or accessible when the controller is in the manual operating state. When in the automatic state, the actual position of the header can be varied using the first operator input, without affecting the set position, the set position being changeable when in the automatic state using other controls.

The directions of movement of the header are preferably upward and downward, but can also include other directions such as forward, rearward and sideward directions or tilt, and the predetermined positions are preferably height positions. Operating modes of the header preferably include a height control mode in which the header is held or maintained at an operating position such as a crop harvesting or cutting position which can be a fixed height in reference to the ground or another reference under control of an automatic height control routine or system, and a float mode wherein the header exerts a set pressure or weight against the actuator or a sensor associated with the actuator under control of a float control routine or system, both in the well known manner. Another of the predetermined positions can be a raised position relative to the harvesting position, for elevating the header for travel over already harvested regions of a field and the like. Alternatively, the two predetermined positions can be selected as different harvesting positions. One or both of the predetermined positions can also have a default or initial value.

As an example, the first predetermined position can have a default or initial value such as a raised, non-harvesting position. From this position, operation of the system can be initiated by an operator utilizing the first operator input to move the header to a new height, which can be, for instance, a different raised position or a harvesting position, and at which position the header will be under automatic height control or float control. The operator can then actuate the third operator input in the appropriate manner to input a signal to the controller to store the current position and operating mode in the memory as the first or second predetermined position and mode.

Once the first and second predetermined positions and modes are set, successive actuations of the second input or resume switch will cause the controller to automatically move the implement between those positions and modes. At any time in both the automatic and manual states, the implement can be manually moved by using the first input. In the automatic state, the change in position will not affect the set position. In the automatic state, the current set position, and also parameters of the operating mode, such as pressure in the float control mode, can be changed using other controls such as a sensitivity control. As an example, if the controller is in the automatic state with the header in a set position and in a set operating mode such as the float control mode with the header in contact with the ground, it is desired to temporarily raise the header to a new position, this can be done using the first operator input. This will likely increase the float control pressure parameter as more of the weight of the header will be supported by the actuator. However, because this change was made using the first operator input in the automatic state, the controller will not save this new position or changed parameter. As a result, when the controller is again toggled to this position, it will return the header to the set position and mode. If, on the other hand, it is desired to change the set position and/or set operating mode parameter or parameters while in the automatic mode, this can be done using different controls.

DETAILED DESCRIPTION OF THE INVENTION

Figure 1:
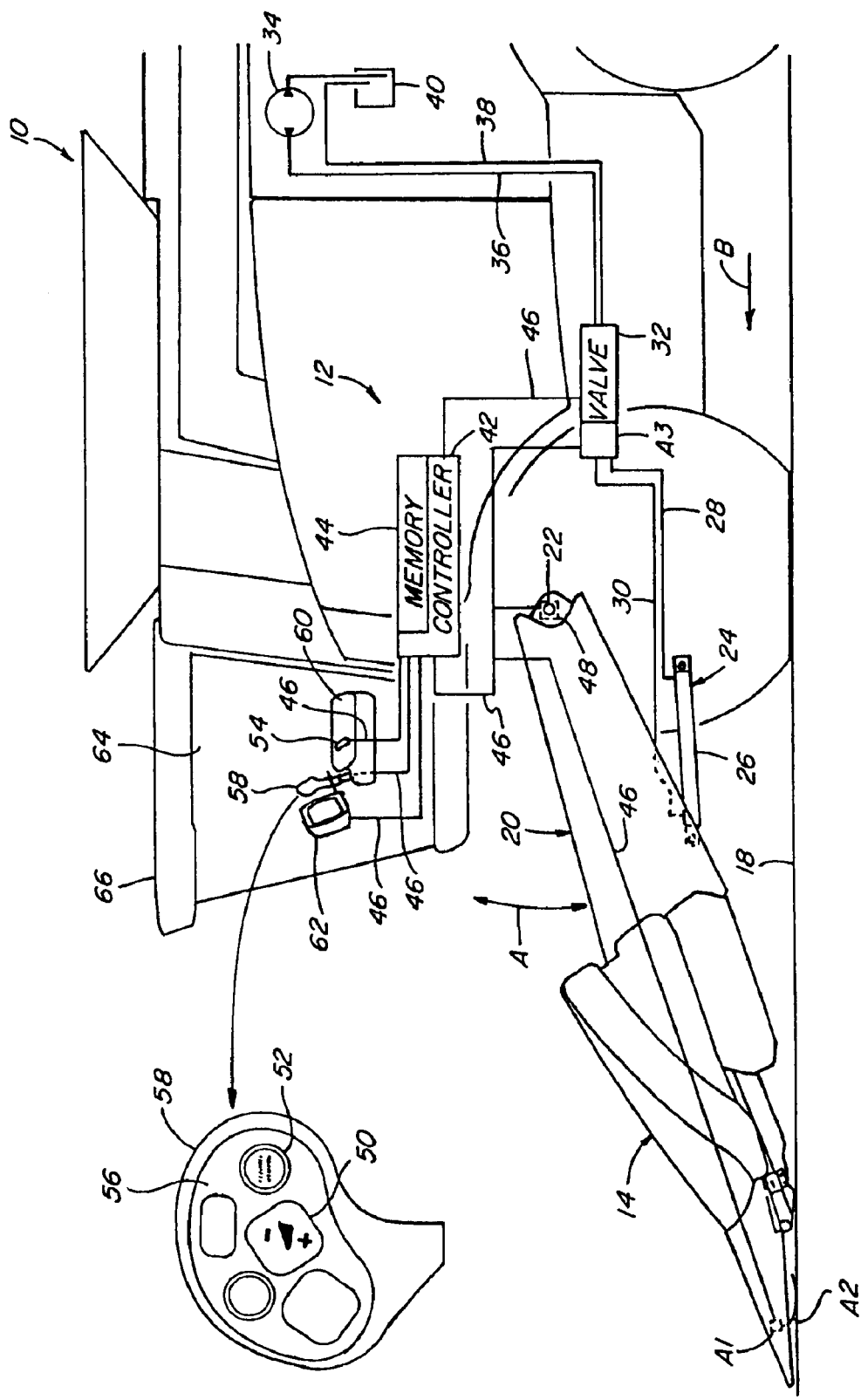
FIG. 1 is a simplified side view of an agricultural combine including a control system according to the invention for moving a header of the combine.

Referring now to the drawings, in FIG. 1, an agricultural combine 10 is shown including a control system 12 constructed and operable according to the teachings of the present invention, for controlling upward and downward movement of a header 14 relative to combine 10, as denoted by arrow A. Header 14 is an implement representative of a conventional, commercially available corn header adapted for harvesting corn crops from a field as combine 10 is moved forwardly over the field, as denoted by arrow B. Header 14 is shown in a representative lower or harvesting position, with a forward end of a support frame 16 in contact with or at a small elevation above a surface such as ground surface 18 on which combine 10 is located. Header 14 is conventionally supported on a forward end of a feeder 20, which in turn, is supported on combine 10 by a pivot 22 for pivotal movement upwardly and downwardly, as denoted by the arrow A, for positioning header 14 at a desired elevation relative to ground surface 18. Feeder 20 and header 14 are raised and lowered by a positioner assembly 24 connected between the forward end of combine 10 and feeder 20.

Positioner assembly 24 includes an actuator 26 which is depicted as a conventional fluid cylinder extendable by introduction of pressurized fluid thereto through a fluid line 28 and removal of fluid through a fluid line 30, for raising feeder 20 and header 14, and which is retractable by introduction of pressurized fluid through fluid line 30 and removal of fluid through fluid line 28, for lowering feeder 20 and header 14. Positioner assembly 24 includes a valve 32 for controlling the fluid flow to actuator 26 from a pressurized fluid source 34, such as a fluid pump or the like, and fluid flow from actuator 26 through a fluid line 38 to a receiver 40, such as a conventional tank, all in the conventional, well known manner. Valve 32 is preferably a conventional electrically or fluid controlled valve of well known construction.

Control system 12 includes a processor operated controller 42 including one or more processors such as a microprocessor or the like, and a memory 44. Controller 42 is operatively connected to valve 32 by a suitable conductive path 46 which can be a wire or wires of a wiring harness, or a wireless conductive path, for controlling valve 32. Controller 42 is connected by a conductive path 46 to a position sensor 48 located in proximity to pivot 22 and operable for sensing or detecting a pivotal position of feeder 20 and header 14 about pivot 22 and outputting signals representative thereof to controller 42, also in the conventional, well known manner. Controller 42 is connected by a conductive path 46 to a position sensor A1 located in header 14 and operable for sensing or detecting a pivotal position of ground sensing wand A2 and outputting signals representative thereof to controller 42, also in the conventional, well known manner. Controller 42 is connected by a conductive path 46 to a pressure sensor A3 located in proximity or connection to valve 32 and fluid line 28 and operable for sensing or detecting a pressure indicative of weight of header 14 acting on actuator 26 and outputting signals representative thereof to controller 42, also in the conventional, well known manner. Controller 42 is additionally operatively connected via conductive paths 46 to several operator inputs of control system 12, including, but not limited to, a first operator input 50, a second operator input 52, and a third operator input 54. First and second operator inputs 50 and 52 are preferably located on a panel 56 of a propulsion handle 58, and third operator input 54 is preferably located on an operator console 60, located generally beside propulsion handle 58. Propulsion handle 58 is adapted and configured to be grasped in a hand of an operator and moved forwardly and rearwardly for correspondingly controlling forward and rearward movements of combine 10 in the well known, conventional manner. Control system 12 additionally includes a display device 62 connected to controller 42' via a conductive path 46, which device 62 can be a conventional CRT or flat panel device or the like for displaying information relating to control system 12, such as, but not limited to, a height position of header 14 as sensed or determined by position sensor 48, as well as other information.

First operator input 50 is preferably operable in at least two manners, including a first manner for inputting first input commands or signals to controller 42, and a second manner for inputting second input commands or signals thereto, for controlling the position of header 14 in a manual operating state. First operator input 50 can be, for instance, a center off toggle or paddle type switch or touch pad that can be depressed or toggled in a first direction for inputting the first input signals or commands to controller 42, and which can be depressed or toggled in a second manner for inputting the second control signals to controller 42. Input 50 could alternatively comprise touch screen buttons. Input 50 can also be actuable in additional manners for effecting other movements of header 14, as desired.

Second operator input 52 can be a suitable device, such as a momentary contact switch, touch pad, or a touch screen button successively momentarily actuable for inputting successive input signals or commands to controller 42. Second operator input 52 is also referred to herein as resume switch 52.

Third operator input 54 is operable in a first manner for inputting a first signal or command to controller 42, and in a second manner for inputting a second input signal or command thereto, and can be, for instance, a center off two position toggle or paddle switch of well known construction or it can comprise a touch pad or touch screen buttons.

Propulsion handle 58, console 60 and display device 62 are shown located within an interior 64 of an operator cab 66 of combine 10, generally to one side of an operator seat (not shown). Typically, an operator will grasp propulsion handle 58 and move it forwardly to cause forward movement of combine 10 at a speed corresponding to the forward position of the handle. Handle 58 will also have a neutral position, and can be movable rearwardly for causing rearward movement of combine 10. A steering wheel (also not shown) is rotatable for effecting turning movements. During operation, an operator will typically grasp handle 58 and utilize one or more fingers for operating inputs thereon, including first operator input 50 for effecting upward and downward movement of header 14 relative to the combine in the manual state of operation. For instance, it will typically be desired to raise header 14 to an elevation above stubble of harvested plants such as in the headlands of a field, and then, when aligned with a swath of crops to be harvested, to lower header 14 to an operating position. Common operating positions can include, for instance, positions at selected heights above the ground as commonly used for harvesting standing wheat and corn. Positions and orientations of header 14 different from that shown will typically be used for harvesting downed corn. For crops to be harvested from plants close to the ground, such as soybeans, header 14 will typically be operated in a float mode with a member in contact with the ground and parameters such as float force (pressure sensed by pressure sensor A3) and height or sensitivity varied by the operator using other controls in cab 66 (not shown). As a result, it has been found to be desirable to have a capability to effect movements of header 14 to the various operational positions and modes, such as the height control or float control mode, and at least one raised position without requiring the operator to remove his or her hand from propulsion handle 58.

Figure 2:
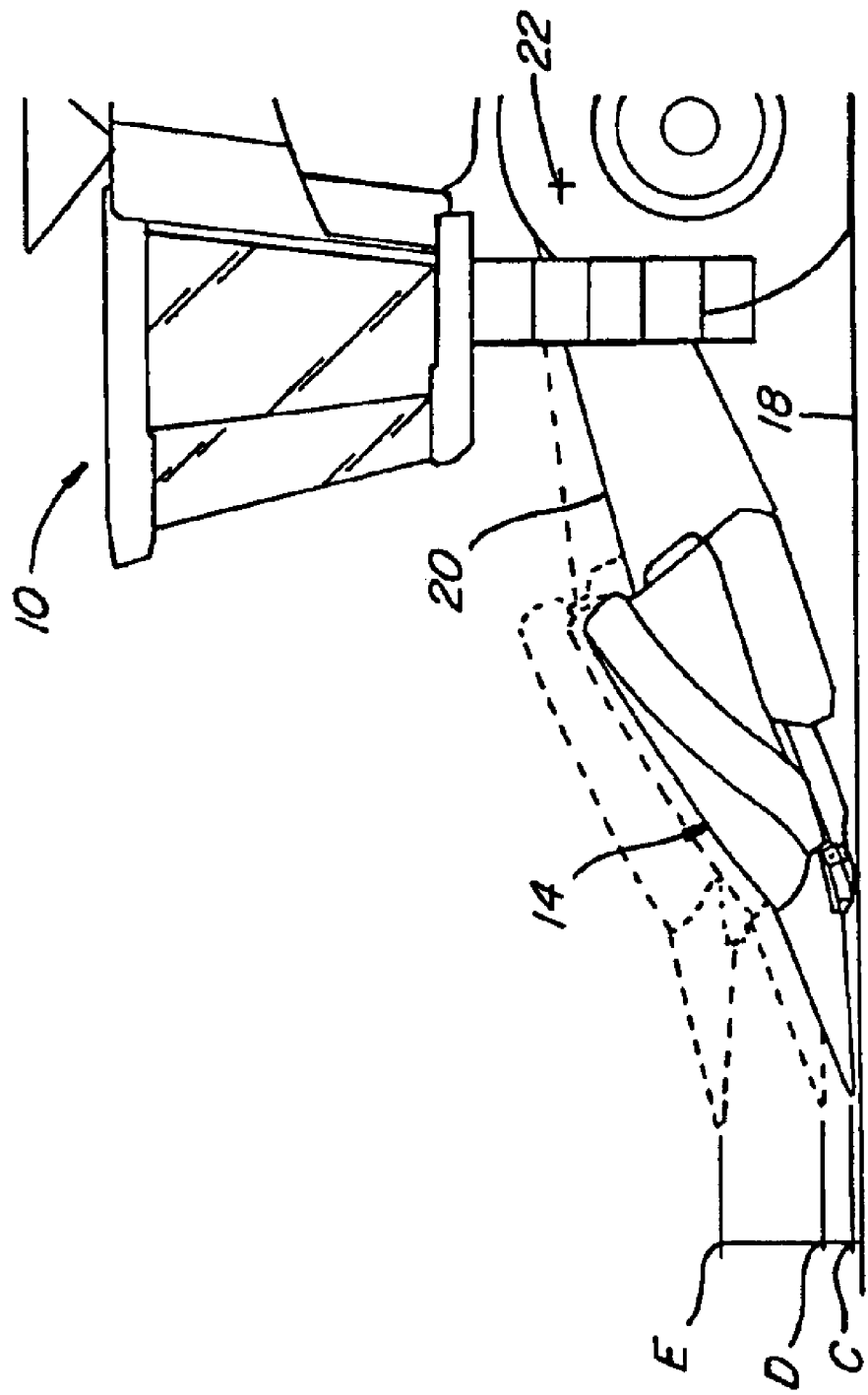
FIG. 2 is another fragmentary side view of the combine, illustrating the header in several positions.

Referring also to FIG. 2, header 14 is shown in solid lines in about the same position as in FIG. 1, that is, at an elevation denoted by line C just above ground surface 18, which for the corn head shown, is generally representative of an operating elevation for harvesting downed corn, it being possible using other controls to vary the tilt or angle of orientation of header 14 as required for this purpose. This would also be generally representative of a position of a grain head for operating in the float mode, for instance, for harvesting soybeans, wherein floating of the header (and pressure sensed by sensor A3) would be under control of a header control or float control routine or system (not shown). Header 14 is shown in dotted lines at a slightly higher elevation denoted by line D which is representative of a higher harvesting position as could be maintained in the height control mode using signals from sensor A1. Header 14 is also shown in dotted lines at an elevation represented by line E, which is representative of a higher raised position, such as might be used for passage over crop stubble, hazards such as ditches and ruts, for entering or exiting a field, and road travel. At this height, ground sensing wand A2 is not in contact with the ground, so the position of header 14 would be determined using position sensor 48. Here, it should be noted that it is desirable for header 14 to be automatically movable to one or more positions generally defined by the distance between lines C and E by actuation or operation of an input preferably located on propulsion handle 58 in a position such that removal or repositioning of the operator's hand is not required. As explained next, this capability is achieved according to the present invention using second operator input or resume switch 52. Controller 42 is programmed to operate in an automatic state such that successive actuations of second operator input 52 will serve as input commands or signals to automatically control actuator 26 to pivot feeder 20 and header 14 about pivot 22 to move header 14 successively between two predetermined positions and modes such as, but not limited to, any two of the positions represented by lines C, D and E, which positions and/or modes are selectable in an easy manner using the invention. Pre-programmed default positions can also be used.

Thus, for example, in the automatic state, by successive actuations or turning on of input 52, an operator would be able to cause header 14 to automatically move from a raised position such as denoted at line E, to a lower, operational position, denoted by line C or D, and in the float control or height control mode, and then, from that operational position and mode, again to the raised position. As another example, the two positions could both be operational positions, such as denoted by lines C and D, and the operating modes could both be float control or height control, or one could be float control and the other height control, as desired. In this latter instance, to move header 14 to a raised position, would require operating first operator input 50. The automatic movements between the two positions can be repeated any desired number of times, for instance, each time combine 10 is turned around in the headlands of a field, or header 14 passes over an obstacle. Second operator input 52 is preferably momentarily actuable, such that successive simple, easy momentary actuations thereof will input successive input signals to controller 42 for initiating automatic control of actuator 26 to move from a current position and mode to the next successive one of the predetermined positions and modes. This is preferably accomplished using a toggling programming routine, as will be explained. Controller 42 is also programmed such that, at any time, an operator can actuate first operator input 50 in a desired manner, for instance, by depressing an upper region of input 50, to operate actuator 26 to move header 14 in a corresponding direction preferably for about the duration of the actuation, in the manual state of operation. When this is done with controller 42 in the automatic state, it will result in corresponding movement of header 14, but not a change in the predetermined position or operating mode. Then, again at any time, automatic operation can be resumed by momentarily actuating second operator input 52 to toggle controller 42 to automatically control actuator 26 to move header 14 to the next successive one of the predetermined positions and operating modes. As a result, the position of header 14 is controllable in both the automatic and manual operating states, using only inputs 50 and 52 on propulsion handle 58. Inputs 50 and 52 are in close proximity on panel 56 of handle 58, such that no repositioning or removal of the hand of the operator is required.

Controller 42 is programmed such that if, while in the automatic operating state, it is desired to change the current predetermined position and/or one or more parameters of the operating mode, this can be done using different inputs (not shown), and the new position and/or mode parameter or parameters will be automatically set such that when input 52 is again toggled to this position and mode, controller 42 will move to the new position and/or apply the new parameter or parameters. Further, controller 42 is programmed according to the invention such that, when in the manual state, a current position and operating mode of header 14 can be simply and easily selected and information representative thereof stored in memory 44 or set as one of the predetermined positions and modes, by momentary actuation of third operator input in a predetermined manner or set state. For instance, for a third operator input 54 which is a momentary contact toggle switch, it can be momentarily toggled to a first position or otherwise actuated in a first manner for automatically storing information representative of the current position and mode as the first predetermined position and mode, and momentarily toggled to a second position or actuated in a second manner for automatically storing information representative of the current position and mode as the second predetermined position and mode. Operation of third operator input 56 while in the automatic state will have no effect.

Optionally, the values for the predetermined positions and modes can be inputted using another suitable input device, such as a numerical touch screen on display device 62. Display device 62 can further be used for displaying a current position and mode of header 14, and also the current set value or values and/or parameters for the predetermined positions and modes. As another option, controller 42 can be programmed to store predetermined header heights or positions and/or modes for harvesting different crops, different conditions, and different headers, as desired, in memory 44. Here, it should be noted that the preferred location for third operator input 54 is separate from inputs 50 and 52, such that inadvertent actuation of input 54 and setting of one or more of the predetermined values is less likely, as selection requires the manual state and deliberate action of removing one's hand from propulsion handle 58 to select or set the value. Information representative of the position and mode of header 14 can be inputted to controller 42 by position sensor 48, alone, or in combination with information from other sensors such as sensors A1 and A3 in the well known manner.

As noted above, header 14 can be automatically held at a height in a height control mode, using an auto height control routine of controller 42, or another device. As an example, after moving header 14 in the automatic or return to cut state to a position for operation in the height control mode, controller 42 or the other device (not shown) is operable for holding header 14 in the set position. This can include operating actuator 26 as required for maintaining header 14 within a range of the current position. The range, nominal position, sensitivity, and other parameters of the height control mode are settable using operator controls (not shown) in operator cab 66. Further, header 14 is operable in the float control mode, that is, under control of a float control routine of controller 42 or another device (not shown) wherein header 14 will be maintained in contact with the ground such that a pressure sensed by sensors A3 will be held within a range of a nominal pressure, the range, nominal position, sensitivity, and other parameters of the float control typically being settable using operator controls (not shown) in operator cab 66.

Figure 3:
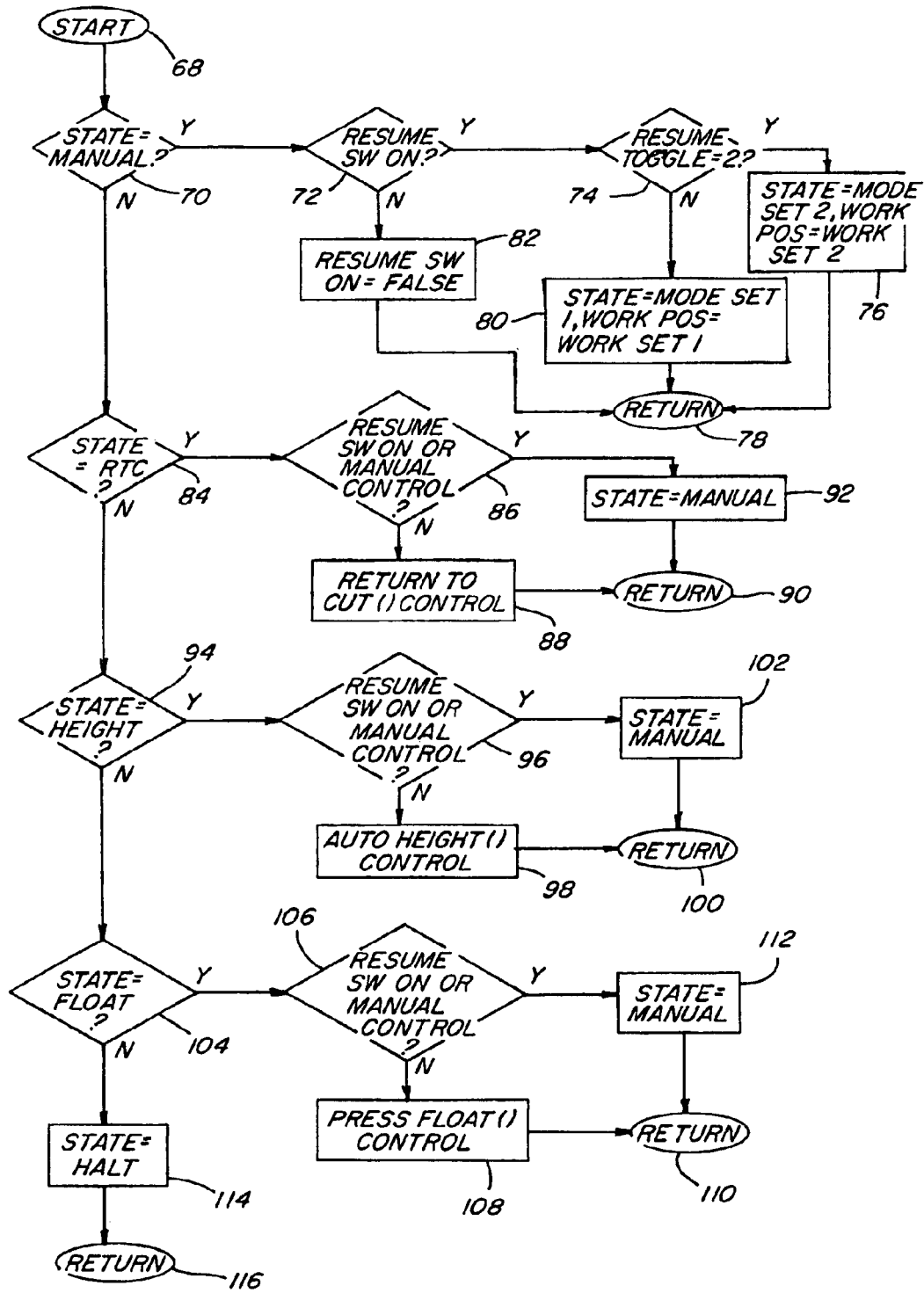
FIG. 3 is a high level flow diagram showing steps of operation of the system.

Referring also to FIG. 3, steps of operation of control system 12 as programmed according to the invention are illustrated. After start block 68, controller 42 will determine whether it is in the manual operating state as denoted at decision block 70. If yes, controller 42 will determine whether the resume switch (second operator input 52) has been actuated or turned on, as denoted at decision block 72. If yes, controller 42 will determine whether input 52 has resultantly toggled it to a resume toggle 2 state, as denoted at decision block 74. If controller 42 determines that it is in the toggle 2 state, it will set the state as the second predetermined mode and the work position as the second predetermined position, as denoted at block 76. The program will then return to start block 68, as denoted at block 78. If, at decision block 74, controller 42 is not in the toggle 2 state, it will determine that it is in the toggle 1 state, as denoted at block 80, set the state as the first predetermined mode and the work position as the first predetermined position. If, at block 72, controller 42' determines that the resume switch (input 52) is not actuated or turned on, as denoted at block 82, the program will return to start block 68, as also denoted at block 78.

At block 70, if the operating state in not manual, controller 42 will determine if the state is RTC (Return To Cut). If yes, controller 42 will determine whether the resume switch or manual control (second operator input 52 or first operator input 50) has been actuated or turned on, as denoted at decision block 86. If not, controller 42 operates in the return to cut state to automatically control actuator 26 to move to the set one of the predetermined positions, or until the height control or float control mode is activated, as denoted by block 88, or the resume switch or manual control is again actuated, as determined at block 86. In these latter two instances, controller 42 will revert to the manual state, as denoted at block 92 and return to start block 68 as denoted at block 90. In the manual state, controller 42 will verify the on state of the resume switch, as denoted at block 72, and again proceed to block 74 to determine whether it is at toggle 2 for the second predetermined position, and if so, will read the information representative of that position and set the state as the second predetermined mode and the work position as the second predetermined position, as denoted at block 76. If, at block 74, controller 42 determines that it is not at toggle 2, it will determine that it is at toggle 1 and will read the information representative of the first predetermined position and set the state as the first predetermined mode and the work position as the first predetermined position as denoted by block 76 and return to block 68. If the state is again RTC, controller 42 will loop through the steps of blocks 68, 70, 84, 86, 88 and 90 to move feeder 20 and header 14 to the appropriate predetermined position and mode, unless the resume switch or manual control is again actuated as denoted by block 86. If the state is not RTC, controller 42 will proceed through block 84 to block 94 to determine if the state is height control. If yes, and the resume switch or manual control is not again actuated or turned on, as determined at block 96, it will initiate automatic control of actuator 26 to move and maintain header 14 at the appropriate predetermined height in the height control mode, as denoted at block 98 and loop through blocks 68, 70, 84, 94, 96, 98 and 100, until the resume switch or manual control is actuated. While in this loop, if the resume switch is actuated as determined at block 96, controller 42 will revert to the manual state, as denoted at block 102 and proceed to operate along the path to the right of decision block 70.

Back at block 94, if the state is not height control, controller 42 will proceed through block 94 to block 104 to determine if the state is float control. If yes, and the resume switch or manual control is not again actuated or turned on, as determined at block 96, it will initiate automatic control of actuator 26 to move and maintain header 14 at the appropriate predetermined pressure, as denoted at block 108 and loop through steps 68, 70, 84, 94, 104, 106, 108 and 110, until the resume switch or manual control is actuated. If controller 42 determines that the resume switch is on, as denoted at decision block 106, it will revert to the manual state, as denoted at block 112 and proceed along the path to the right of block 70, as set forth above.

If controller 42 determines that none of the above-discussed operating states denoted by blocks 70, 84, 94 and 104 are present, it will determine that it is in a halt state, as denoted at block 114, and return to start block 68, as denoted at block 116. If not placed in one of the above-discussed operating states, controller 42 will loop through blocks 68, 70, 84, 94, 104, 114 and 116 until a change of state occurs.

Figure 4:
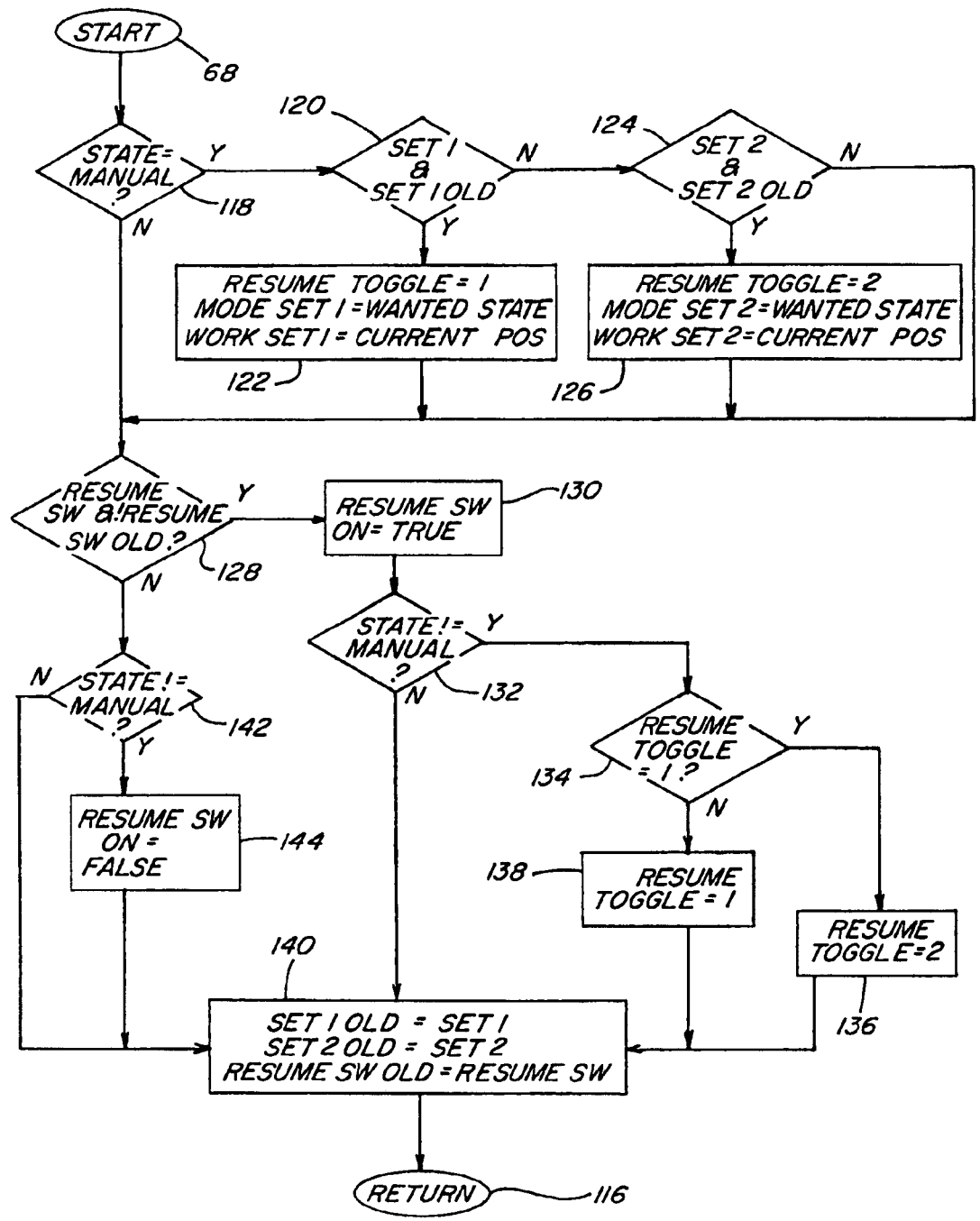
FIG. 4 is a high level flow diagram showing additional steps of operation of the system of the invention.

Referring also to FIG. 4, programmed operational steps of controller 42 of system 12 in the set state, is shown. From start block 68, according to the preferred steps of operation, the set state can be initiated only when controller 42 is in a manual operating state. If controller 42 is in a manual operating state, as determined at decision block 118, and third operator input 54 is actuated in the first manner for setting or storing information representative of the current position and mode as the first predetermined position and mode, as denoted at block 120, controller 42 will set the resume toggle to the toggle 1 state and set the current mode as the wanted state and the current position as the first predetermined position, as denoted at block 122. If, instead, third operator input 54 is actuated in the second manner to set or store information representative of the current position and mode as the second predetermined position and mode, as denoted at block 124, controller 42 will set the resume toggle to the toggle 2 state and set the current mode as the wanted state and current position as the second predetermined position, at denoted at block 126. Then, after either of the above occurrences, if controller 42 detects that the resume switch (input 52) is newly actuated as denoted at block 128, it will determine that the resume switch is on, as denoted at block 130. If controller 42 is not actuated in the manual state, for instance by actuation of input 50, it will proceed to toggle to its next successive toggle state, by first determining if it is presently in toggle state 1, as denoted at block 134. If yes, it will toggle to toggle state 2, as denoted at block 136. If the current toggle state is not toggle 1, controller 42 will toggle to that state, as denoted at block 138. In either instance, controller 42 will retain the position and mode just set in the steps denoted by blocks 120 and 122 or 124 and 126 and toggle to the next successive toggle state, as denoted at block 140, and return to start block 68, as denoted at block 116.

Referring again to block 132, if controller 42 is in the manual state, it will proceed to block 140 to set the new position and mode and return to the start block, without toggling to the next resume toggle state.

At block 128, if the resume switch is not newly actuated, controller 42 will proceed through blocks 142 and 144 to block 140 and retain any new positions and modes selected in steps 120 or 124 as denoted at block 140 and return to start block 68.

Here, it should be noted that when controller 42 is operating in the return to cut state to move header 14 toward a predetermined position and operating mode such as the float control mode or the height control mode, header 14 may reach the predetermined operating mode value (float pressure as sensed by sensor A3 or height from the ground as sensed by sensor A1) before reaching the predetermined position (sensed by sensor 48). In this instance, upon reaching the pressure or height value, controller 42 will then commence operation in the appropriate operating mode and disregard the predetermined position. Also, although the operating and setting steps set forth above are in reference to positions of a header upwardly and downwardly, it should be noted that such steps are likewise applicable to controlling movements of the heads in other directions and manners.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A control system for an actuator for moving a header relative to a combine including a propulsion handle movable by an operator for controlling movement of the combine, the control system comprising:
    a first operator input on the propulsion handle;
    a second operator input on the propulsion handle;
    a third operator input; and
    a controller including a processor and a memory for storing information representative of positions of the header, the controller being connected to at least the second input and the third input for receiving input signals therefrom and to the actuator, and the controller being programmed to operate
        (a) in a manual state to allow an operator to use the first operator input for controlling the actuator to move the header;
        (b) in an automatic state responsive to an input signal from the second operator input to automatically control the actuator to move the header to a predetermined position and operating mode represented by information stored in the memory; and
        (c) in a set state responsive to an input signal from the third operator input to store information in the memory representative of a current position and operating mode of the header as the predetermined position and mode.

2. The control system of claim 1, wherein the controller is operable in the set state to store information representative of a current position and operating mode of the header as a second predetermined position and mode responsive to a second input signal from the third operator input.

3. The control system of claim 1, wherein the second operator input comprises a resume switch.

4. The control system of claim 2, wherein the predetermined positions are height positions of the header relative to the combine.

5. The control system of claim 2, wherein the second operator input is successively actuable by an operator for automatically moving the header between the predetermined positions and modes.

6. The control system of claim 1, wherein when the controller is in the set state, operator actuation of the second operator input will commence operation of the controller in the automatic state.

7. The control system of claim 2, wherein the controller is programmed such that when in the set state, operator actuation of the second operator input will commence operation of the controller in the automatic state so as to automatically control the actuator to move the header to a next successive one of the predetermined positions and modes.

8. The control system of claim 2, wherein the controller is programmed such that at any time during operation in the manual state, actuation of the third operator input to input one of the input signals to the controller will commence operation of the controller in the set state to store information representative of a current position and mode of the header in the memory as one of the predetermined positions and modes, and a next subsequent actuation of the second operator input will commence operation of the controller in the automatic state to move the header to the other of the predetermined positions and modes.

9. In a vehicle including a propulsion handle movable for controlling movements of the vehicle, and a positioner assembly controllably operable for moving an implement relative to the vehicle, a control system for the positioner assembly comprising:
   a controller including a processor for controlling the positioner assembly for moving the implement responsive to input commands to the controller;
   a first operator input on the propulsion handle connected to the controller and actuable by an operator for inputting commands to the controller for controlling the positioner assembly to move the implement;
   a second operator input on the propulsion handle connected to the controller and actuatable for inputting an input command to the controller, wherein responsive to successive input commands from the second operator input the controller will automatically control the positioner assembly for moving the implement successively to a first predetermined position and mode and to a second predetermined position and mode, respectively; and
   a memory and a third operator input, the controller being operable such that when the implement is in a selected position and mode, the third operator input can be actuated for storing information representative of the selected position and mode in the memory as the first predetermined position and mode such that subsequently when an input command from the second operator input is received by the controller for moving the implement to the first predetermined position and mode, the controller will automatically control the positioner assembly to move the implement to the selected position and mode.

10. In the vehicle of claim 9, the controller being programmed such that when the implement is in a selected position and mode, the third operator input can be actuated in a second manner for storing information representative of the selected position and mode in the memory as the second predetermined position and mode, such that subsequently when an input command from the second operator input is received by the controller for moving the implement to the second predetermined position and mode, the controller will automatically control the positioner assembly to move the implement to the selected position and mode.

11. In the vehicle of claim 9, the second operator input comprising a resume switch separate from the first input.

12. In the vehicle of claim 9, the vehicle comprising an agricultural combine and the implement comprising a header of the combine.

13. A control system for a positioner assembly for moving a header relative to a combine, comprising:
   a controller including a processor and a memory, the controller being operable for controlling the positioner assembly responsive to operator input commands for moving the header to at least a first predetermined position and mode represented by information stored in the memory and a second predetermined position and mode represented by information stored in the memory;
   a first operator input connected to the controller and actuable by an operator in a first manner for inputting input commands to the controller for controlling the positioner assembly to move the header in a first direction relative to the combine, and in a second manner for inputting operator input commands to the controller for controlling the positioner assembly to move the header in a second direction relative to the combine;
   a second operator input connected to the controller and successively momentarily actuable for inputting input commands to the controller for initiating operation of the controller for automatically controlling the positioner assembly to move the header to the first predetermined position and mode and to the second predetermined position and mode, respectively; and
   a third operator input actuable in a first manner for automatically storing information representative of a current position and mode of the header in the memory as the first predetermined position and mode, and actuable in a second manner for automatically storing information representative of a current position and mode of the header in the memory as the second predetermined position and mode.

14. The control system of claim 13, wherein the second operator input comprises a resume switch.

15. The control system of claim 13, wherein the first and second operator inputs are located on a handle of a propulsion control of the combine operable for controlling movements of the combine.

16. The control system of claim 13, wherein the third operator input comprises a two position momentary contact switch on an operator console separate from the first and second operator inputs.

17. A control system for a positioner assembly for moving a header relative to a combine, comprising:
   a controller including a processor and a memory, the controller being automatically operable for controlling the positioner assembly responsive to operator input commands for moving the header to at least a first predetermined position and mode represented by information stored in the memory and a second predetermined position and mode represented by information stored in the memory;
   a first operator input actuable by an operator for controlling the positioner assembly to move the feeder and header relative to the combine;
   a second operator input connected to the controller and successively actuable for inputting the input commands to the controller for automatically controlling the positioner assembly for successively moving the header to the first and second predetermined positions and modes, respectively; and a third operator input actuable for automatically storing information representative of a current position of the header in the memory as the first predetermined position and mode or the second predetermined position and mode.

18. The control system of claim 17, wherein the second operator input comprises a momentary contact switch on a propulsion handle of the combine.

19. The control system of claim 17, wherein the third operator input is actuable for automatically storing information representative of the current position and mode as the first predetermined position and mode, or the second predetermined position and mode, respectively, only when the positioner assembly is under control of the first operator input.

20. In a combine including a propulsion handle movable for controlling movements of the vehicle, and a positioner assembly for moving a header relative to the vehicle, a control system for the positioner assembly comprising:

a controller including a processor for controlling the positioner assembly for moving the header responsive to input commands to the controller;

a first operator input on the propulsion handle connected to the controller and selectably actuable by an operator in a first manner for inputting commands to the controller for controlling the positioner assembly to move the header in a first direction for a period of time about equal to a duration of the actuation in the first manner, and selectably actuable by an operator in a second manner for inputting commands to the controller for controlling the positioner assembly for moving the header in a second direction for a period of time about equal to a duration of the actuation in the second manner;

a second operator input on the propulsion handle connected to the controller and momentarily actuatable for inputting an input command to the controller, wherein responsive to successive input commands from the second operator input the controller will automatically control the positioner assembly for successively moving the header to a first predetermined position and a second predetermined position; and a memory and a third operator input, wherein when the header is in a selected position, the third operator input can be actuated in a first manner for automatically storing information representative of the, selected position in the memory as the first predetermined position such that subsequently when an input command from the second operator input is received by the controller for moving the header to the first predetermined position, the controller will automatically control the positioner assembly to move the header to the selected position.

21. In the combine of claim 20, wherein when the header is in a second selected position, the third operator input can be actuated in a second manner for automatically storing information representative of the second selected position in the memory as the second predetermined position, such that subsequently when an input command from the second operator input is received by the controller for moving the header to the second predetermined position, the controller will automatically control the positioner assembly to move the header to the second selected position.

22. A control system for an actuator for moving a header relative to a combine, comprising:

a first operator input;

a second operator input;

a third operator input; and a controller including a processor and a memory, the controller being operatively connected to the first input, the second input, and the third input for receiving input signals therefrom, and the controller bring operatively connected to the actuator for controlling the actuator for moving the header responsive to the input signals from the inputs, the controller being programmed to operate in a manual state to control the actuator to move the header in a first direction responsive to a first input signal from the first operator input and in a second direction responsive to a second input signal from the first operator input, to operate in an automatic state responsive to successive input signals from the second operator input to automatically control the actuator to move the header successively to a first predetermined position and a second predetermined position based on information representative of the predetermined positions stored in the memory, and the controller being operable in a set state responsive to first and second input signals from the third operator input to store information representative of a current position of the header in the memory as the first and second predetermined positions, respectively.

23. The control system of claim 22, wherein the first and second inputs are located on a propulsion handle of the combine movable by an operator for controlling movements of the combine.

24. The control system of claim 22, wherein the second operator input comprises a momentary contact switch which is successively actuable by an operator for moving the header successively to the first and second predetermined positions, respectively.

25. The control system of claim 22, wherein when the controller is in the set state, operator actuation of the second operator input will commence operation of the controller in the automatic state so as to control the actuator to move the header to a next successive one of the predetermined positions.

26. A method for controlling an actuator for moving a header relative to a combine including a propulsion handle movable by an operator for controlling movement of the combine, the method comprising steps of:

(a) providing a first operator input on the propulsion handle;

(b) providing a second operator input on the propulsion handle;

(c) providing a third operator input; and (d) providing a controller including a processor and a memory for storing information representative of positions of the header, the controller being connected to at least the second input and the third input for receiving input signals therefrom and to the actuator, wherein the controller will operate:

(i) in a manual state for allowing the actuator to move the header responsive to input signals from the first operator input;

(ii) in an automatic state responsive to an input signal from the second operator input to automatically control the actuator to move the header to a predetermined position represented by information stored in the memory; and (iii) in a set state responsive to an input signal from the third operator input to store information in the memory representative of a current position of the header as the predetermined position.

27. The method of claim 26, wherein step (d)(iii) responsive to a second input signal from the third operator input the controller will store information representative of a current position of the header as a second predetermined position.

28. The method of claim 27, wherein step (d)(ii) responsive to successive actuations of the second operator input the controller will automatically control the actuator to move the header between the predetermined positions.

29. The method of claim 26, wherein when the controller is in the set state, operator actuation of the second operator input will commence operation of the controller in the automatic state.

30. The method of claim 27, wherein step (d)(iii) when the controller is in the set state, operator actuation of the second operator input will commence operation of the controller in the automatic state so as to control the actuator to move the header to a next successive one of the predetermined positions.

31. The method of claim 27, wherein when the controller is in the manual state, actuation of the third operator input to input one of the input signals to the controller will commence operation of the controller in the set state to store information representative of a current position of the header in the memory as one of the predetermined positions, and a next subsequent actuation of the second operator input will commence operation of the controller in the automatic state to move the header to the other of the predetermined positions.

* * * * *